US012709668B2

(12) United States Patent
Zhou et al.

(10) Patent No.: US 12,709,668 B2
(45) Date of Patent: Aug. 18, 2026

(54) EPOXY-BASED RESIN COMPOSITION FOR CLEAR FIBER COMPOSITES AND EPOXY-BASED CLEAR FIBER COMPOSITES

(71) Applicants: Kaneka Americas Holding, Inc., Pasadena, TX (US); KANEKA CORPORATION, Osaka (JP)

(72) Inventors: Tianlei Zhou, Pasadena, TX (US); Raymond Wong, Pasadena, TX (US); Leonid Vorobyev, Pasadena, TX (US)

(73) Assignees: Kaneka Americas Holding, Inc.; KANEKA CORPORATION, Osaka (JP)

( * ) Notice: Subject to any disclaimer, the term of this patent is extended or adjusted under 35 U.S.C. 154(b) by 231 days.

(21) Appl. No.: 18/693,642

(22) PCT Filed: Sep. 30, 2022

(86) PCT No.: PCT/US2022/045411

§ 371 (c)(1),
(2) Date: Mar. 20, 2024

(87) PCT Pub. No.: WO2023/056035

PCT Pub. Date: Apr. 6, 2023

(65) Prior Publication Data

US 2024/0392086 A1 Nov. 28, 2024

Related U.S. Application Data

(60) Provisional application No. 63/250,699, filed on Sep. 30, 2021.

(51) Int. Cl.
*C08J 5/24* (2006.01)
*B32B 5/02* (2006.01)
(Continued)

(52) U.S. Cl.
CPC ................ *C08J 5/244* (2021.05); *B32B 5/02* (2013.01); *B32B 5/26* (2013.01); *C08G 59/245* (2013.01);
(Continued)

(58) Field of Classification Search
CPC ........ C08G 59/00; C08G 59/02; C08G 59/22; C08G 59/223; C08G 59/226; C08G 59/24; C08G 59/36; C08G 59/38
See application file for complete search history.

(56) References Cited

U.S. PATENT DOCUMENTS 6,818,306 B2 11/2004 Miller et al.
8,841,377 B2 9/2014 Sekine
(Continued)

OTHER PUBLICATIONS

International Search Report issued in corresponding International Application No. PCT/US2022/045411 mailed Jan. 20, 2023 (4 pages).

(Continued)

*Primary Examiner* — Zachary M Davis
(74) *Attorney, Agent, or Firm* — Osha Bergman Watanabe & Burton LLP

(57) ABSTRACT

An epoxy-based resin composition for clear fiber composites includes epoxy resins and an anhydride curing agent. The epoxy resins include at least one epoxy resin having a refractive index higher than a refractive index of glass fibers, and at least one cycloaliphatic epoxy resin. The amount of non-aromatic components in the epoxy-based resin composition is 60 wt % or higher, based on the total amount of the epoxy resins and the anhydride curing agent. An epoxy-based clear fiber composite for a cover plate in a solar cell panel includes a cured matrix resin and a fiber reinforcement. The epoxy-based clear fiber composite has a refractive index ranging from 1.520 to 1.530 or 1.550 to 1.565, while the difference between the refractive index of the fiber (Continued)

reinforcement and the cured matrix resin is 0.001 or less. A multi-layer epoxy-based clear fiber composite includes a plurality of the epoxy-based clear fiber composite.

20 Claims, 1 Drawing Sheet

(51) Int. Cl.
*B32B 5/26* (2006.01)
*C08G 59/24* (2006.01)
*C08G 59/42* (2006.01)

(52) U.S. Cl.
CPC .......... *C08G 59/4238* (2013.01); *C08J 5/249* (2021.05); *B32B 2260/023* (2013.01); *B32B 2260/046* (2013.01); *B32B 2262/101* (2013.01); *B32B 2307/414* (2013.01); *B32B 2307/546* (2013.01); *B32B 2307/718* (2013.01); *B32B 2457/12* (2013.01); *C08J 2363/02* (2013.01)

(56) References Cited

U.S. PATENT DOCUMENTS

| | | | |
|---|---|---|---|
| 9,701,068 B2 | 7/2017 | Choiniere et al. | |
| 2004/0132867 A1 | 7/2004 | Shibahara et al. | |
| 2021/0002415 A1* | 1/2021 | Zheng .................. | C09D 163/00 |
| 2024/0166816 A1* | 5/2024 | Ikeuchi .................... | C08J 5/244 |

OTHER PUBLICATIONS

Written Opinion issued in corresponding International Application No. PCT/US2022/045411 mailed Jan. 20, 2023 (6 pages).

* cited by examiner

100
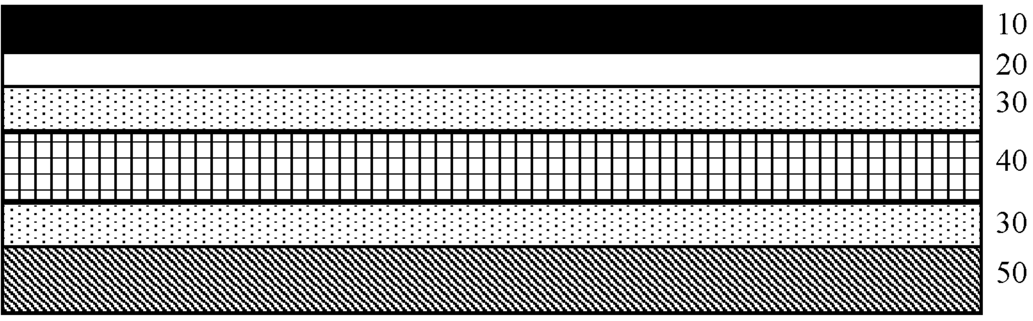
10
20
30
40
30
50

EPOXY-BASED RESIN COMPOSITION FOR CLEAR FIBER COMPOSITES AND EPOXY-BASED CLEAR FIBER COMPOSITES

BACKGROUND

Various power generation methods and processes using renewable energy sources have been gaining traction as viable alternatives to power generation using conventional energy sources (such as fossil fuel, hydro, and nuclear). Presently, one of the most widely used alternative energy sources is solar power generation, in which solar cells (also known as photovoltaic cells) convert solar energy into electrical energy. The photovoltaic cells are commonly made of crystalline silicone and are generally considered to be fragile materials. In a typical solar panel configuration, a collection of solar cells are combined with other materials, such that the solar panel may be transported, installed, and used without issues in different geographical locations and under various conditions. Such materials may include a glass cover plate to protect the solar cells from objects that may come into contact with the solar panel.

However, a glass cover plate is relatively heavy and may not withstand high impact forces, such as hails falling onto the solar panel. In addition, a glass cover plate tends to shatter when excess force is applied, such as accidental contact by a worker who steps on the solar panel, damaging the panel and themselves. Solar panels are also being installed in more vehicles such as automobiles and trucks, and a glass cover plate may shatter from flying objects such as rocks and debris.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an epoxy-based resin composition for clear fiber composites, comprising one or more epoxy resins and an anhydride curing agent. The epoxy-based resin composition may include one or more epoxy resins comprising at least one epoxy resin having a refractive index higher than a refractive index of a glass fiber, and the one or more epoxy resins may comprise at least one cycloaliphatic epoxy resin. The amount of non-aromatic components in the epoxy-based resin composition may be 60 wt % or higher based on a total amount of the one or more epoxy resins and the anhydride curing agent. The epoxy-based resin composition may have a viscosity of lower than 1000 cPs at 25° C. and lower than 400 cPs at 35° C., and a pot life of more than 6 hours at 25° C. and more than 3 hours at 35° C.

In another aspect, embodiments disclosed herein relate to a cured epoxy-based resin product of the epoxy-based resin composition.

In yet another aspect, embodiments disclosed herein relate to an epoxy-based prepreg comprising a fiber reinforcement and the epoxy-based resin composition.

In another aspect, embodiments disclosed herein relate to an epoxy-based clear fiber composite for a cover plate in a solar cell panel, comprising a cured matrix resin; and a fiber reinforcement. The epoxy-based clear fiber composite may have a refractive index ranging from 1.520 to 1.530 or 1.550 to 1.565, and a difference between the refractive index of the fiber reinforcement and a refractive index of the cured matrix resin of 0.001 or less.

Other aspects and advantages of the claimed subject matter will be apparent from the following description and the appended claims.

BRIEF DESCRIPTION OF THE DRAWING

FIG. 1 illustrates a typical configuration of a solar panel which includes one or more epoxy-based clear fiber composites according to the embodiments herein.

DETAILED DESCRIPTION

Solar panels generally include multiple layers of materials along with the solar cells to provide various functions such as protection of the solar cells. For example, FIG. 1 illustrates a typical solar panel configuration that includes an epoxy-based clear fiber composite according to the embodiments herein. A solar panel 100 may include a frame 10, a cover plate 20, encapsulants 30 (which may be a polymeric material), solar cells 40, and a back sheet 50. The cover plate 20 may act as a protective layer for the solar cells 40 and may also provide rigidity to the solar panel 100. The cover plate 20 may be produced with the epoxy-based clear fiber composites of one or more embodiments of the present disclosure. The epoxy-based clear fiber composite may be used because of its high optical clarity and high transmittance of sun light, directly affecting the light conversion efficiency of the solar panel.

Embodiments disclosed herein generally relate to an epoxy-based clear fiber composite, which may be used in, but is not limited to, solar panel applications. Furthermore, embodiments disclosed herein generally relate to an epoxy-based resin formulation for the epoxy-based clear fiber composition.

Fiber composite materials generally include a fibrous material and a matrix material, which may be a polymeric resin, and are known to be light weight and provide good mechanical properties including flexural modulus and impact resistance. However, fiber composite materials do not generally have high optical clarity or light transmittance properties.

In one or more embodiments, the epoxy-based clear fiber composite disclosed herein may provide optically-clear panels with high transmittance, serving as a replacement material for standard glass cover plates of solar panels. Such epoxy-based clear fiber composite may provide required mechanical properties at a reduced thickness and weight when compared to standard glass cover plates or non-epoxy, thermoplastic plates such as polycarbonates and polymethymethacrylate (PMMA).

Epoxy-Based Resin Composition

In one aspect, embodiments disclosed herein relate to an epoxy-based resin composition for clear fiber composites, comprising one or more epoxy resins and an anhydride curing agent.

In particular, in one or more embodiments of the epoxy-based resin composition, one or more epoxy resins comprise at least one epoxy resin having a refractive index higher than a refractive index of a glass fiber, and the one or more epoxy resins also comprise at least one cycloaliphatic epoxy resin. In one or more embodiments, the amount of non-aromatic components in the epoxy-based resin composition is 60 wt % or higher based on the total amount of the one or more epoxy resins and an anhydride curing agent, the epoxy-based resin composition has a viscosity of lower than 1000 cPs at 25° C. and lower than 400 cPs at 35° C., and the epoxy-based resin composition has a pot life of more than 6 hours at 25° C. and more than 3 hours at 35° C.

A "pot life" of an epoxy represents the amount of time that the viscosity of the epoxy resin remains sufficiently low and workable. Specifically, the pot life may be defined as the amount of time required for the viscosity of the epoxy-based resin composition to double when compared to its initial viscosity. The initial viscosity refers to the viscosity of the composition measured immediately (such as within 10 minutes) after the epoxy resin and the curing agent are mixed together.

The presently described epoxy-based resin composition may be a two-part system. In the two-part system, the epoxy resins and curing agents are typically stored separately and mixed just prior to use. The mixing is usually conducted by the user of the resin.

The epoxy-based resin composition may have good processability, including low viscosity at temperatures such as 25° C. and 35° C., and good pot life to provide sufficient working time during the application of the epoxy-based resin composition.

The term "epoxy-based" refers to a material that includes, at minimum, one or more components with epoxide-groups. A material that is "epoxy-based" may exclusively contain one or more components with epoxide-groups, or may contain one or more components with epoxide-groups and, optionally, other components.

The term "clear fiber composite" refers to a composite material containing a fiber-based reinforcement and a resin, and having characteristics such that the light can transmit through the composite. The clear fiber composite of the present disclosure may be a transparent material, may also include a translucent material, and may have a light transmittance of 90% or higher when the clear fiber composites has a thickness of 0.6 mm or more.

In one or more embodiments, the epoxy-based resin composition may contain one or more epoxy resins. The one or more epoxy resins may be epoxy resins conventionally used in producing fiber composite materials and may be solid, liquid or semi-solid at room temperature. However, the present epoxy resins are not limited to such conventionally-used epoxy resins and may include any resins containing epoxide groups.

In one or more embodiments, the one or more epoxy resins may include, but are not limited to, pure aliphatic epoxy resins, pure cycloaliphatic epoxy resins, and epoxy resin containing aromatic structures. In embodiments using a cycloaliphatic epoxy resin, it is envisioned that the epoxide group may be present on or off the cyclic structure. Examples of the pure aliphatic epoxy resins may include DE-202 and DE-203, examples of the pure cycloaliphatic epoxy resins include Celloxide 2021P (available from Daicel Corporation) and Eponex™ 1510 (available from Hexion Inc.), and examples of the epoxy resin-containing aromatic structures may include D.E.R.™-332 (available from Olin Corporation) and Epotec® YD-127 and YD-128 (available from Aditya Birla Chemicals Ltd.).

In one or more embodiments, one or more epoxy resins may include at least one epoxy having a refractive index (RI) higher than the RI of a glass fiber. The RI of a glass fiber may vary depending on the type of glass fiber used. An E-glass fiber may have the RI ranging from 1.550 to 1.565. A high-strength, high-modulus fiber, such as S-2 Glass® fiber (manufactured by AGY Holding Corp.), may have the RI ranging from 1.520 to 1.530.

In one or more embodiments, the epoxy-based resin composition may contain non-aromatic components in an amount of about 30 wt % or higher, based on the total amount of the one or more epoxy resins and curing agent. Aromatic components of epoxy resin correspond to the benzene rings present in the epoxy resin. Non-aromatic components of the epoxy resin correspond to the rest of the epoxy polymeric structures, excluding the benzene rings. Epoxy resins containing a substantially high amount of aromatic components may have inferior UV resistance properties. In solar panel applications, the panel may be expected to be optically stable for more than 20 years under regular exposure to the sunlight. In one or more embodiments, the epoxy-based resin composition may contain non-aromatic components, based on the total amount of the one or more epoxy resins and curing agent, in an amount ranging from a lower limit selected from one of 30 wt %, 35 wt %, 40 wt %, 45 wt %, 50 wt %, 55 wt %, 60 wt %, 61 wt %, 62 wt %, 63 wt %, 64 wt %, 65 wt %, and 70 wt %, to an upper limit selected from one of 90 wt %, 95 wt %, 96 wt %, 97 wt %, 98 wt %, 99 wt %, and 100 wt %, where any lower limit may be paired with any upper limit.

In one or more embodiments, the epoxy-based resin composition may contain an anhydride curing agent. The anhydride curing agents may include non-aromatic anhydride, aromatic anhydride, or a mixture thereof. In one or more embodiments, the epoxy-based resin composition may contain the anhydride curing agent, based on the total amount of the epoxy-based resin composition, in an amount ranging from a lower limit selected from one of 30 wt %, 35% wt %, 40 wt %, 45 wt %, and 50 wt %, to an upper limit selected from one of 60 wt %, 65 wt %, and 70 wt %, where any lower limit may be paired with any upper limit. In embodiments using an anhydride curing agent, the epoxy-based resin composition may contain non-aromatic components in an amount of about 60 wt % or higher, based on the total amount of the one or more epoxy resins and anhydride curing agent. In one or more embodiments, the epoxy-based resin composition comprising an anhydride curing agent contains non-aromatic components, based on the total amount of the one or more epoxy resins and anhydride curing agent, in an amount ranging from a lower limit selected from one of 60 wt %. 61 wt %, 62 wt %, 63 wt %, 64 wt %, 65 wt %, and 70 wt %, to an upper limit selected from one of 90 wt %, 95 wt %, 96 wt %, 97 wt %, 98 wt %, 99 wt %, and 100 wt %, where any lower limit may be paired with any upper limit.

In one or more embodiments, the epoxy-based resin composition may contain one or more curing agents including, but not limited to, aliphatic amines, aromatic amines, modified amines, polyamides, secondary and tertiary amines, Lewis acids/bases, acids, imidazoles, phenolic resins, dicyandiamide, hydrazides, and photo-curing and ultraviolet-curing agents. In one or more embodiments, the epoxy-based resin composition may contain such curing agent, based on the total amount of the epoxy-based resin composition, in an amount ranging from a lower limit selected from one of 0.01 wt. %, 0.1 wt %, 1 wt %, 5 wt %, 10 wt %, 15 wt %, 20 wt %, 25 wt %, 30 wt %, 35% wt %, 40 wt %, 45 wt %, and 50 wt %, to an upper limit selected from one of 2 wt %, 5 wt %, 10 wt %, 20 wt %, 30 wt %, 40 wt %, 50 wt %, 60 wt %, and 70 wt %, where any lower limit may be paired with any upper limit.

In one or more embodiments, the epoxy-based resin composition may contain catalysts. Catalysts may also be referred to as accelerators and may be used in epoxy formulations in conjunction with curing agents in order to accelerate the rate of curing and reduce the curing time. Catalysts that may be used in the epoxy-based resin composition may include imidazole, tertiary amine, phenol, alcohol, acid, and Lewis acid. In one or more embodiments, the epoxy-based resin composition may contain catalysts, based on the total amount of the epoxy-based resin composition, in an amount ranging from a lower limit selected from one of 0.01 wt %, 0.1 wt %, 0.5 wt %, 1.0 wt %, 2.0 wt %, 3.0 wt %, 4.0 wt %, and 5.0 wt %, to an upper limit of 8.0 wt %, 9.0 wt %, and 10.0 wt %, where any lower limit may be paired with any upper limit.

In one or more embodiments, epoxy-based resin composition may further contain one or more additives. Additives are used in epoxy formulations to improve various properties. Additives that may be used in one or more embodiments of the epoxy-based resin composition may include, but are not limited to, tougheners, plasticizers, fire retardant (FR) additives, viscosity modifiers and diluents, anti-foaming agents, wetting agents, adhesion promoters and coupling agents (such as silanes), nano particles, inorganic and organic fillers, fumed silica, pigments, solid and hollow glass microspheres, and chopped and milled fiberglass. In one or more embodiments, the epoxy-based resin composition may contain the additives, based on the total amount of the epoxy-based resin composition, in an amount ranging from a lower limit selected from one of 0.01 wt %, 0.1 wt %, 0.5 wt %, 1.0 wt %, 2.0 wt %, 3.0 wt %, 4.0 wt %, and 5.0 wt %, to an upper limit of 10 wt %, 15 wt %, 20 wt %, 25 wt %, 30 wt %, 40 wt %, 50 wt %, 60 wt %, and 70 wt %, where any lower limit may be paired with any upper limit.

In one or more embodiments, the epoxy-based resin composition may contain other types of resins to optimize various properties, and may include thermoplastic resins such as polyesters, polyamides (Nylon), PEI, PPS, PEEK, PEKK, thermoplastic polyurethanes, and the like.

In one or more embodiments, the epoxy-based resin composition may contain solvents. Solvents conventionally used in epoxy formulations may be added to the epoxy-based resin composition, and may include ketones such as acetone and MEK, glycol ethers, THF, DMF, and the like.

Epoxy-Based Resin Composition-Properties

In one or more embodiments, the epoxy-based resin composition may have a viscosity of about 1000 cPs or lower at 25° C. Viscosity may be measured, for example, using Brookfield DV2T viscometer with spindle model CPA-52Z at a spinning speed of 4 rpm. In one or more embodiments, the epoxy-based resin composition may have a viscosity ranging from a lower limit selected from one of 1 cPs, 5 cPs, 10 cPs, 20 cPs, 30 cPs, 40 cPs and 50 cPs, to an upper limit selected from one of 500 cPs, 550 cPs, 600 cPs, 650 cPs, 700 cPs, 750 cPs 800 cPs, 850 cPs, 900 cPs, 950 cPs, and 1000 cPs, where any lower limit may be paired with any upper limit.

In one or more embodiments, the epoxy-based resin composition may have a viscosity of about 400 cPs or lower at 35° C. Viscosity may be measured, for example, using a Brookfield DV2T viscometer with spindle model CPA-52Z at a spinning speed of 4 rpm. In one or more embodiments, the epoxy-based resin composition may have a viscosity ranging from a lower limit selected from one of 0.1 cPs, 1 cPs, 5 cPs, 10 cPs, 20 cPs, 30 cPs, 40 cPs and 50 cPs, to an upper limit selected from one of 200 cPs, 250 cPs, 300 cPs, 350 cPs, 400 cPs, 450 cPs, 500 cPs, 550 cPs, and 600 cPs, where any lower limit may be paired with any upper limit.

In one or more embodiments, the epoxy-based resin composition may have a pot life of about 6 hours or longer at 25° C., such as 6 hours or longer, 7 hours or longer, 8 hours or longer, 9 hours or longer, 10 hours or longer, 15 hours or longer, or 20 hours or longer.

In one or more embodiments, the epoxy-based resin composition may have a pot life of about 3 hours or longer at 35° C., such as 3 hours or longer, 4 hours or longer, 5 hours or longer, 6 hours or longer, 7 hours or longer, 8 hours or longer, 9 hours or longer, or 10 hours or longer.

In one or more embodiments, the epoxy-based resin composition may have an initial curing temperature of lower than about 120° C. An initial curing temperature refers to a minimum temperature required to properly cure the epoxy-based resin composition and provide optimal cured properties. In one or more embodiments, the epoxy-based resin composition may have an initial curing temperature selected from one of 120° C. or lower, 115° C. or lower, 110° C. or lower, 105° C. or lower, 100° C. or lower, 95° C. or lower, 90° C. or lower, 85° C. or lower, and 80° C. or lower.

In one or more embodiments, the epoxy-based resin composition may have a reaction enthalpy of lower than about 300 J/g. Reaction enthalpy is the amount of energy released in the form of heat when the epoxy resins and curing agent react in the epoxy-based resin composition. The heat generated as a result of the reaction increases the temperature of the composition and further accelerates the reaction, which generates additional heat at a faster rate. This phenomenon is often referred to as "exotherm" and, if not controlled properly, may lead to a run-away reaction and excessive heating of the composition. In some cases, such run-away reaction may result in the incineration and thermal degradation of the composition. One way to reduce the risk of exotherm is by optimizing the formulation of the epoxy-based resin composition such that the reaction of enthalpy of the composition is sufficiently low. In one or more embodiments, the reaction enthalpy may be determined from a DSC graph and calculated by the TA Instruments Universal Analysis 2000 software. The reaction enthalpy is represented by the area under the peak, or the total area under the peaks if multiple peaks are present in the DSC graph. In one or more embodiments, the epoxy-based resin composition may have a reaction enthalpy selected from one of 300 J/g or lower, 280 J/g or lower, 260 J/g or lower, 240 J/g or lower, 220 J/g or lower, and 200 J/g or lower.

Manufacturing Methods—Epoxy-Based Resin Composition

An epoxy-based resin composition in accordance with the present disclosure may be prepared in any conventional batch, semi-batch, or continuous mixing devices. In one or more embodiments, epoxy-based resin composition may be prepared by mixing in any known processes for epoxy resin composition such as high shear mixers, planetary mixers, duel and triple-shaft mixers, static mixers, and any other available manufacturing processes.

In one or more embodiments, all components, including one or more epoxy resins and a curing agent, may be mixed together in a single step. In a two-part system in which the curing agents are selected such that the resin composition may have relatively short pot life, the mixing process may be conducted just prior to the use of the epoxy composition.

In one or more embodiments, there may be a pre-mixture step of the one or more epoxy resins and other components (such as additives, other types of resins and solvents). Such mixture may be referred to as a "pre-mix" or a "master-batch" and it may be possible to safely produce in large quantity and store until its use. Because such mixture typically does not contain curing agents or catalysts, unintentional curing of the composition is not likely to occur.

Cured Epoxy-Based Resin Products

In one aspect, embodiments disclosed herein relate to a cured epoxy-based resin product of the epoxy-based resin composition for clear fiber composites. The epoxy-based resin composition containing epoxy resins and a curing agent, under an appropriate temperature, undergoes an irreversible, exothermic reaction to form a polymer network and become a cured epoxy-based resin product, which is a cured product of the epoxy-based resin composition.

In one or more embodiments, the cured epoxy-based resin product may have an RI of about 1.520 to 1.565. The RI of the cured epoxy-based resin product may be determined by a refractometer, such as a Rudolph J357 Automatic Refractometer. In one or more embodiments, the cured epoxy-based resin product may have an RI ranging from a lower limit selected from one of 1.520, 1.521, 1.522, 1.523 and 1.524, to an upper limit selected from one of 1.555, 1.556, 1.557, 1.558, 1.559, 1.560, 1.561, 1.562, 1.563, 1.564, and 1.565, where any lower limit may be paired with any upper limit. In one or more embodiments, the cured epoxy-based product may have an RI such that the difference between the RI of the cured epoxy-based resin product and the RI of glass fiber may be 0.001 or less, 0.0009 or less, 0.0008 or less, 0.0007 or less, 0.0006 or less, or 0.0005 or less, when the cured epoxy-based product and the glass fiber are at the same temperature.

In one or more embodiments, the cured epoxy-based resin product may have a glass transition temperature (Tg) of higher than about 120° C., according to dynamic mechanical analysis (DMA). In one or more embodiments, the Tg may be determined by conducting DMA using an analyzer such as Q800 DMA (available from TA Instruments), with parameters including, for example, a temperature range of 25° C. to 350° C., a ramp speed of 5° C./min, a frequency of 1 Hz, and an amplitude of 10 microns. In one or more embodiments, the cured epoxy-based resin product may have a Tg selected from one of 120° C. or higher, 125° C. or higher, 130° C. or higher, 135° C. or higher, 140° C. or higher, 145° C. or higher, 150° C. or higher, 155° C. or higher, and 160° C. or higher.

In one or more embodiments, the cured epoxy-based resin product may have a flexural modulus of higher than about 3 GPa, according to ASTM D790. In one or more embodiments, the cured epoxy-based resin product may have a flexural modulus selected from one of 3 GPa or higher, 3.25 GPa or higher, 3.5 GPa or higher, 3.75 GPa or higher, and 4 GPa or higher.

In one or more embodiments, the cured epoxy-based resin product may have a flexural strain of higher than about 3%, according to ASTM D790. In one or more embodiments, the cured epoxy-based resin product may have a flexural strain selected from of 3% or higher, 3.25% or higher, 3.5% or higher, 3.75% or higher, 4% or higher, and 5% or higher.

In one or more embodiments, the cured epoxy-based resin product may have a density of lower than about 1.2 g/cm$^3$. In one or more embodiments, the density may be measured by using a balance with a density measurement feature, such as a Mettler Toledo ML3002E balance. In one or more embodiments, the cured epoxy-based resin product may have a density selected from one of 1.2 g/cm$^3$ or lower, 1.19 g/cm$^3$ or lower, 1.18 g/cm$^3$ or lower, 1.17 g/cm$^3$ or lower, 1.16 g/cm$^3$ or lower, 1.15 g/cm$^3$ or lower, 1.14 g/cm$^3$ or lower, 1.13 g/cm$^3$ or lower, 1.12 g/cm$^3$ or lower, 1.11 g/cm$^3$ or lower, and 1.10 g/cm$^3$ or lower.

Epoxy-Based Clear Fiber Composites

In one aspect, embodiments disclosed herein related to an epoxy-based clear fiber composite. The epoxy-based clear fiber composite may provide good UV resistance, light transmittance, and mechanical properties, and may be used as a cover plate in a solar cell panel, by way of example.

In one or more embodiments, the epoxy-based clear fiber composite may include a cured matrix resin and a fiber reinforcement. In one or more embodiments, the epoxy-based clear fiber composite may have a fiber reinforcement having a refractive index (RI) ranging from about 1.520 to 1.530 or 1.550 to 1.565, and a difference between the RI of the fiber reinforcement and the RI of the cured matrix resin may be 0.001 or less.

In one or more embodiments, the cured matrix resin may be the cured epoxy-based resin composition as provided in the previous sections. However, the cured matrix resin is not limited to the cured epoxy-based resin composition, and any suitable epoxy-based resins may be used. In one or more embodiments, the cured matrix resin may include one or more epoxy resins and a curing agent, and the curing agent may be an anhydride curing agent.

In one or more embodiments, the epoxy-based clear fiber composite may include at least one epoxy resin having a refractive index (RI) higher than an RI of a glass fiber. In one or more embodiments, the epoxy-based clear fiber composite may include at least one cycloaliphatic epoxy resin.

In one or more embodiments, the epoxy-based clear fiber composite may include non-aromatic components in the cured matrix resin in an amount of 30 wt % or higher, based on the total amount of the one or more epoxy resins and the curing agent. In one or more embodiments, the epoxy-based clear fiber composite contains non-aromatic components, based on the total amount of the one or more epoxy resins and curing agent, in an amount ranging from a lower limit selected from one of 30 wt %, 35 wt %, 40 wt %, 45 wt %, 50 wt %, 55 wt %, 60 wt %, 61 wt %, 62 wt %, 63 wt %, 64 wt %, 65 wt %, and 70 wt %, to an upper limit selected from one of 90 wt %, 95 wt %, 96 wt %, 97 wt %, 98 wt %, 99 wt %, and 100 wt %, where any lower limit may be paired with any upper limit In one or more embodiments, the fiber reinforcement of the epoxy-based clear fiber composite may contain glass fiber (also known as fiberglass). In one or more embodiments, the glass fiber may be any one of a number of commercially-available glass fibers and specialty glass fibers including E-glass, A-glass, C-glass, D-glass, AR-glass, and high-strength glass fibers. The high-strength glass fibers provide higher strength and modulus than E-glass fibers and may include S-1 Glass™, S-2 Glass®, S-3 Glass™, Zentron® (manufactured by AGY Holding Corp), R-glass, and T-glass (manufactured by Nitto Boseki Col, Ltd.). In one or more embodiments, a customized glass fiber designed and optimized for the epoxy-based clear fiber composite may be used.

In one or more embodiments, the fiber reinforcement of the epoxy-based clear fiber composite may be any types of fiber which is suitable to be used in the epoxy-based clear fiber composite. In one or more embodiments, such fibers may include polymeric fibers and quartz fibers.

In one or more embodiments, the fiber reinforcement may be a textile-based reinforcement. The textile-based reinforcement may include, but is not limited to, woven fabrics, knitted fabrics, braided fabrics, stitch-bonded fabrics, needle punch fabric, non-woven fabrics including spunbound/spunlace, airlaid, drylaid, and wetlaid fabrics.

In one or more embodiments, the fiber reinforcement may be provided as a unidirectional reinforcement (UD). UD may contain one or more yarns, which may be mono-filament or multi-filament, or one or more rovings, which contain a plurality of yarns, arranged in one direction.

In one or more embodiments, the fiber reinforcement may be a non-treated, or greige, reinforcement. In one or more embodiments, the fiber reinforcement may be treated with various agents to optimize various properties of the epoxy-based clear fiber composites. The treatment of the fiber reinforcement may be conducted during the production of the fiber, during the production of intermediate materials such as the textile-based reinforcement or pre-impregnated materials (prepregs), or during the production of the epoxy-based clear fiber composites.

In one or more embodiments, the fiber reinforcement may include one or multiple types of fibers.

In one or more embodiments, the epoxy-based clear fiber composites may contain one or multiple layers of fiber reinforcement. Multiple layers of the fiber reinforcement may include the same type of fiber reinforcement or a combination of different fiber reinforcements in order to optimize various properties of the epoxy-based clear fiber composites.

In one or more embodiments, the fiber reinforcement may have a refractive index (RI) of about 1.520 to 1.530. In one or more embodiments, the fiber reinforcement may have an RI ranging from a lower limit selected from one of 1.520, 1.5205, 1.5210, 1.5215, 1.5220, 1.5225, and 1.5230, to an upper limit selected from one of 1.5270, 1.5275, 1.5280, 1.5285, 1.5290, 1.5295 and 1.5300, where any lower limit may be paired with any upper limit.

In one or more embodiments, the fiber reinforcement may have a refractive index (RI) of about 1.550 to 1.565. In one or more embodiments, the fiber reinforcement may have an RI ranging from a lower limit selected from one of 1.550, 1.551, 1.552, 1.553, and 1.554, to an upper limit selected from one of 1.562, 1.563, 1.564, and 1.565, where any lower limit may be paired with any upper limit.

In one or more embodiments, the epoxy-based clear fiber composites may have a cured matrix resin having an RI, such that the difference between the RI of the fiber reinforcement and the RI of the cured matrix resin is about 0.001 or less. In one or more embodiments, the difference between RI of the fiber reinforcement and the cured matrix resin may be selected from one of 0.001 or less, 0.00095 or less, 0.00090 or less, 0.00085 or less, and 0.00080 or less.

In another aspect, embodiments disclosed herein relate to a multi-layer epoxy-based clear fiber composites ("multi-layer clear composites") including a plurality of the epoxy-based clear fiber composites. In one or more embodiments, the multi-layer clear composites may contain the same type of epoxy-based clear fiber composites. In one or more embodiments, the multi-layer epoxy-based clear fiber composites may contain different types of epoxy-based clear fiber composites, which may include different types of fiber reinforcements and/or cured matrix resins. In one or more embodiments, the multi-layer clear composites may be produced by stacking a plurality of the epoxy-based clear composites, and the layers are secured together through various methods, including mechanically fastening using bolts, nails, clamps rivets and the like, or bonding using adhesives, tapes and the like. In one or more embodiments, the multi-layer clear composites may be produced by partially curing each layer first, combining all layers, and subsequently, fully curing all layers together.

Epoxy-Based Clear Fiber Composites-Properties

In one or more embodiments, the epoxy-based clear fiber composite may have a density ranging from about 1.5 g/cm$^3$ to 2.0 g/cm$^3$, and the density may be determined by using a balance such as a Mettler Toledo ML3002E. In one or more embodiments, the epoxy-based clear fiber composite may have a density ranging from a lower limit selected from one of 1.50 g/cm$^3$, 1.52 g/cm$^3$, 1.54 g/cm$^3$, 1.56 g/cm$^3$, 1.58 g/cm$^3$, and 1.60 g/cm$^3$, to an upper limit selected from one of 1.90 g/cm$^3$, 1.92 g/cm$^3$, 1.94 g/cm$^3$, 1.96 g/cm$^3$, 1.98 g/cm$^3$, and 2.00 g/cm$^3$, where any lower limit may be paired with any upper limit.

In one or more embodiments, epoxy-based clear fiber composite may have a fiber volume fraction of the fiber reinforcement ranging from about 10% to 90% according to ASTM D3171. The fiber volume fraction represents the amount of fiber present in the composite based on the total volume of the composite. In one or more embodiments, the epoxy-based clear fiber composite may have a fiber volume fraction ranging from a lower limit selected from one of 10%, 20%, 30%, 35%, and 40%, to an upper limit selected from one of 60%, 65%, 70%, 80%, and 90%.

In one or more embodiments, the epoxy-based clear fiber composite may have a light transmittance of higher than about 90%, when the light has a wavelength in a range of 450 nm to 650 nm and the epoxy-based clear fiber composite has a thickness ranging from 0.6 mm to 0.8 mm. In one or more embodiments, the light transmittance may be measured by using a spectrometer system such as an OceanOptics optical fiber spectrometer system with a xenon light source such as HPX2000. In one or more embodiments, the epoxy-based clear fiber composites may have a light transmittance selected from one of 90% or higher, 91% or higher, 92% or higher, 93% or higher, 94% or higher, and 95% or higher.

In one or more embodiments, epoxy-based clear fiber composite may have a Tg of higher than about 120° C., according to dynamic mechanical analysis (DMA). In one or more embodiments, the epoxy-based clear fiber composite may have a Tg selected from one of 120° C. or higher, 125° C. or higher, 130° C. or higher, 135° C. or higher, 140° C. or higher, 145° C. or higher, 150° C. or higher, 155° C. or higher, and 160° C. or higher.

In one or more embodiments, the epoxy-based clear fiber composite may have a flexural modulus of about 15 GPa or higher according to ASTM D790. In one or more embodiments, the epoxy-based clear fiber composite may have a flexural modulus selected from one of 15 GPa or higher, 20 GPa or higher, 25 GPa or higher, 30 GPa or higher, 35 GPa or higher, and 40 GPa or higher.

In one or more embodiments, epoxy-based clear fiber composite may have an impact resistance higher than the impact resistance of glass having the same thickness as the epoxy-based clear fiber composite.

Manufacturing Methods—Epoxy-Based Clear Fiber Composites

Epoxy-based clear fiber composites in accordance with the present disclosure may be prepared by a wide variety of fiber composite production methods. Such production methods may include, but are not limited to, resin infusion process (various techniques including resin transfer molding (RTM), vacuum-assisted resin transfer molding (VARTM), Seemann Composites resin infusion molding process (SCRIMP™), film infusion process etc.), wet-layup process, and processes in which prepregs are used, such as autoclave/vacuum bag molding, hot press molding, compression molding and oven/vacuum bag molding.

In one or more embodiments, the epoxy-based clear fiber composite may be produced by a resin infusion process, which may include steps of placing fiber reinforcement onto a tooling or a mold and then placing a flexible membrane/film over the reinforcement and providing a seal along the perimeters ("bagging"), applying a pressure by evacuating air from the sealed bag to apply a pressure, and then infusing or injecting uncured epoxy-based resin composition into the fiber reinforcement. In one or more embodiments, a rigid mold may be used over the reinforcement instead of the flexible membrane/film, and a positive pressure is applied by closing the rigid mold prior to the introduction of the resin. In resin infusion process, the fiber reinforcement may be laid up onto the tooling as dry fiber reinforcement. In one or more embodiments, the fiber reinforcement may contain a small amount of binder or "tackifier" material in order to keep the layers of fiber reinforcement together and prevent the fiber reinforcement from shifting during the lay-up and bagging process. Tackifier may be a high-tack composition or a composition which may melt at a moderately elevated temperature, and the tackifier may be a composition that is compatible with the epoxy-based resin composition being injected or infused. The tackifier may be applied to the fiber reinforcement during the lay-up process or may be applied during the production of the fiber reinforcement material. Resin infusion process may be conducted at a room temperature or at an elevated temperature.

In one or more embodiments, the epoxy-based clear fiber composite may be produced from a prepreg. A "prepreg" refers to an intermediate material in which a fiber reinforcement is combined with uncured epoxy-based resin composition. In one or more embodiments, the prepreg may contain a "B-staged" resin composition, in which the resin composition may be partially reacted in advance so that the viscosity of the resin composition is increased and the adhesiveness or "tack" of the prepreg is optimized for handling. In one or more embodiments, the prepreg may contain a latent curing agent and may be produced in advance (such as weeks or months) prior to its use. In one or more embodiments, the prepreg may be produced just prior to their use. In such embodiments, it may be possible to use faster curing epoxy compositions in the prepreg.

In one or more embodiments, prepregs may be produced by immersing the fiber reinforcement through a resin bath with an epoxy-based resin composition, squeezing the resin composition out of the fiber reinforcement to obtain a desired amount of resin in the reinforcement, and drying the fiber reinforcement impregnated with the resin to adjust the tack and/or remove volatile components. In one or more embodiments, films of the epoxy-based resin composition may be produced and the films and the fiber reinforcement may be combined under an elevated pressure and/or temperature to produce a prepreg. In one or more embodiments, the prepreg may contain a fiber reinforcement fully impregnated with the resin composition, while in one or more embodiments, the fiber reinforcement may be partially impregnated. The fiber reinforcement may include any of the fiber reinforcement described in the previous section and may include textile-based reinforcement and UD reinforcement. In one or more embodiments, the epoxy-based resin composition for producing prepregs may contain solvents. In one or more embodiments, the epoxy-based resin composition for producing prepreg may be free of solvents or volatile organic compounds and may be liquid, semi-solid, or solid at room temperature. Epoxy-based resin compositions that do not contain solvents and are not semi-sold or solid at room temperature may be referred to as "hot-melt" compositions, because heat may be required to melt the resin before prepregs or films are produced from the epoxy-based resin composition.

When prepregs are used to produce one or more embodiments of the epoxy-based clear fiber composites, elevated pressure and/or temperature may be required to produce the embodiment epoxy-based clear fiber composites. Suitable processes may include, but are not limited to, autoclave/vacuum bag molding, hot press molding, compression/press molding, and oven/vacuum bag molding.

In one or more embodiments, a wet-layup process may be used to produce the epoxy-based clear fiber composites. In the wet-layup process, the epoxy-based resin composition may be directly applied to the fiber reinforcement using various application techniques such as rollers, brushes, sprays and the like. The "wet" fiber reinforcement, or the reinforcement containing uncured epoxy-resin composition, may be further processed under an elevated temperature and/or pressure using any of the molding processes described in the previous section.

In one or more embodiments, the epoxy-based clear fiber composites may be produced at room temperature, without the addition of heat. In one or more embodiments, the epoxy-based clear fiber composites may be produced by using a cure cycle with ramping and dwelling stages. A cure cycle, or a cure profile, refers to as a time schedule specifying temperatures and pressures to which the materials (such as fiber composites) are being subjected to. In the ramping stage, the temperature is being increased or decreased from one temperature to another, and the rate of ramping may be constant or variable. In the dwelling stage, a specific temperature is held for a specific amount of time. The cure cycle may have one or multiple ramping stages and one or more dwelling stages. In one or more embodiments, the epoxy-based clear fiber composites may be produced at an elevated temperature and pressure but without the use of ramping stages. Such production method may be referred to as "hot-in, hot-out" process.

EXAMPLES

The following examples are provided to illustrate embodiments of the present disclosure. The examples are not intended to limit the scope of the present invention, and they should not be so interpreted.

Example 1

A two-part epoxy-based resin composition was prepared by producing 100 g Part A component including cycloaliphatic epoxy resin, bisphenol A epoxy resin which has an RI of 1.51050-1.51150, and 85 g Part B component including anhydride curing agent. Part A and Part B were mixed together and the viscosity was measured at 25° C. and 35° C. A portion of the mixed composition was set aside to determine the pot life of the composition, while another portion of the mixed composition was cured at 90° C. for 1.5 hours and then 120° C. for 1.5 hours. Physical properties obtained from EXAMPLE 1 are shown in Table 1:

TABLE 1

| Uncured composition properties | | | | Cured composition properties | | |
|---|---|---|---|---|---|---|
| Pot life at 25° C. | Pot life at 35° C. | Viscosity at 25° C. | Viscosity 35° C. | Refractive index | Tg (DMA) | Refractive index of glass fiber |
| 7 hrs | 4 hrs | 1000 cps | 353 cps | 1.500-1.560 | 146° C. | 1.52426-1.52927 (S2 Glass) 1.558-1.562 (E glass) |

Example 2

The epoxy-based resin composition of EXAMPLE 1 was combined with 2 layers of S-2 Glass® fabric style 758-AC-1400 (available from AGY) to produce an epoxy-based clear fiber composite by Vacuum Assisted Resin Transfer Molding Process (VARTM). The physical and mechanical properties of EXAMPLE 2 and conventionally-available materials are shown in Table 2:

TABLE 2

| | EXAMPLE 2 | Polycarbonate | PMMA | Glass |
|---|---|---|---|---|
| Areal weight (Kg/$m^2$) 0.7 mm thickness | 1.76 | 1.2 | 1.2 | 2.52 |
| Transmittance (%) | 90-92* | 86-88 | 91-92 | >93.8%** |
| Flexural modulus (GPa) | 47 | 2.3 | 2.9 | N/A |
| Tg (° C.) | 146-148 | 147 | 85-165 | N/A |

*Transmittance measured at a light wavelength range of 420-680 nm, panel thickness of 0.91 mm based on 2 ply fabric
**Transmittance based on a light wavelength range of 380-1100 nm Data in Table 2 illustrates that the clear epoxy-based fiber composite of EXAMPLE 2 has a substantially high transmittance of above 90%, which may be considered as an acceptable level of transmittance for a cover plate of a solar panel. The areal weight of EXAMPLE 2 is approximately 30% lower than the glass panel of the same thickness.

The data further illustrates that the flexural modulus of EXAMPLE 2 is substantially higher than polymeric materials such as polycarbonate and PMMA. Because flexural modulus determines the rigidity of the cover plate, higher modulus materials (such as the epoxy-based clear fiber composite of EXAMPLE 2) would provide the equivalent panel rigidity at a lower plate thickness than lower modulus materials (such as polycarbonate and PMMA). Therefore, even though polymers such as polycarbonate and PMMA have lower density than EXAMPLE 2, use of epoxy-based clear fiber composite may result in the reduction of overall cover plate weight.

Furthermore, the epoxy-based clear fiber composites have impact resistance substantially higher than glass and do not shatter to produce hazardous sharp pieces. Such features render the epoxy-based clear fiber composite to be a safer alternative to the glass cover plate.

In addition to the use as a cover plate in a solar cell panel, one or more embodiments of the epoxy-based clear fiber composite may be used in transparent ballistic protection systems that have been assembled on vehicles, aircrafts, and other mobilities, as well as in buildings where transparency is required in addition to ballistic properties. The systems with light weight provide benefits in many applications, especially for mobilities.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. An epoxy-based resin composition for clear fiber composites, comprising:
- one or more epoxy resins; and
- an anhydride curing agent;
- wherein:
  - the one or more epoxy resins comprise at least one epoxy resin having a refractive index higher than a refractive index of a glass fiber,
  - the one or more epoxy resins comprise at least one cycloaliphatic epoxy resin,
  - an amount of non-aromatic components in the epoxy-based resin composition is 60 wt % or higher, based on a total amount of the one or more epoxy resins and the anhydride curing agent,
  - the epoxy-based resin composition has a viscosity of lower than 1000 cPs at 25° C. and lower than 400 cPs at 35° C., and
  - the epoxy-based resin composition has a pot life of more than 6 hours at 25° C. and more than 3 hours at 35° C.

2. The epoxy-based resin composition of claim 1, further comprising one or more catalysts.

3. The epoxy-based resin composition of claim 1, further comprising one or more additives.

4. The epoxy-based resin composition of claim 1 having an initial cure temperature of 120° C. or lower.

5. The epoxy-based resin composition of claim 1 having a heat of reaction of 300 J/g or lower.

6. An epoxy-based prepreg comprising a fiber reinforcement and the epoxy-based resin composition of claim 1.

7. A cured epoxy-based resin product of the epoxy-based resin composition of claim 1.

8. The cured epoxy-based resin product of claim 7 having a refractive index ranging from 1.520 to 1.565.

9. The cured epoxy-based resin product of claim 7 having a glass transition temperature (Tg) higher than 120° C., according to dynamic mechanical analysis (DMA).

10. The cured epoxy-based resin product of claim 7 having a flexural modulus higher than 3 GPa and a flexural strain higher than 3%, according to ASTM D790.

11. The cured epoxy-based resin product of claim 7 having a density lower than 1.2 g/$cm^3$.

12. An epoxy-based clear fiber composite for a cover plate in a solar cell panel, the epoxy-based clear fiber composite comprising:
- a cured matrix resin; and
- a fiber reinforcement,
- wherein:
  - a refractive index of the fiber reinforcement ranges from 1.520 to 1.530 or from 1.550 to 1.565,
  - a difference between the refractive index of the fiber reinforcement and a refractive index of the cured matrix resin is 0.001 or less, and
  - the cured matrix resin is a cured epoxy-based resin product of an epoxy-based composition comprising:
  - one or more epoxy resins; and
  - a curing agent;
  - wherein the epoxy-based composition has a heat of reaction of 300 J/g or lower.

13. The epoxy-based clear fiber composite of claim 12, wherein:

the one or more epoxy resins comprise at least one epoxy resin with a refractive index higher than a refractive index of a glass fiber, the one or more epoxy resins comprise at least one cycloaliphatic epoxy resin, and an amount of non-aromatic components in the cured matrix resin is 30 wt % or higher, based on a total amount of the one or more epoxy resins and the curing agent.

14. The epoxy-based clear fiber composite of claim 12, wherein the cured matrix resin further comprises one or more additives.

15. The epoxy-based clear fiber composite of claim 12 having a flexural modulus of 15 GPa or higher according to ASTM D790.

16. The epoxy-based clear fiber composite of claim 12 having a light transmittance of higher than 90%, when a light has a wavelength in a range of 450 nm to 650 nm and the epoxy-based clear fiber composite has a thickness of 0.6 mm or more.

17. The epoxy-based clear fiber composite of claim 12 having a Tg of higher than 120° C., according to dynamic mechanical analysis (DMA).

18. The epoxy-based clear fiber composite of claim 12, having an impact resistance higher than an impact resistance of glass having a same thickness as the epoxy-based clear fiber composite.

19. A multi-layer epoxy-based clear fiber composite comprising a plurality of the epoxy-based clear fiber composite of claim 12.

20. The epoxy-based clear fiber composite of claim 12, having a glass transition temperature (Tg) in a range of from 120° C. to 148° C., according to dynamic mechanical analysis (DMA).

* * * * *